United States Patent
Lei et al.

(10) Patent No.: US 10,152,379 B1
(45) Date of Patent: Dec. 11, 2018

(54) EFFICIENT GARBAGE COLLECTION FOR DISTRIBUTED STORAGE WITH FORWARD ERROR CORRECTION

(71) Applicant: EMC IP Holding Company LLC, Hopkinton, MA (US)

(72) Inventors: Lu Lei, Shanghai (CN); Ao Sun, Shanghai (CN); Chen Wang, Shanghai (CN); Ronnie Cai, Shanghai (CN); Shashwat Srivastav, Seattle, WA (US); Jun Luo, Bellevue, WA (US); Jialei Wu, Shanghai (CN); Dong Wang, Shanghai (CN); Sriram Sankaran, Redmond, WA (US); Yu Teng, Shanghai (CN)

(73) Assignee: EMC IP HOLDING COMPANY LLP, Hopkinton, MA (US)

( * ) Notice: Subject to any disclaimer, the term of this patent is extended or adjusted under 35 U.S.C. 154(b) by 51 days.

(21) Appl. No.: 15/390,765

(22) Filed: Dec. 27, 2016

(51) Int. Cl.
*G11C 29/00* (2006.01)
*G06F 11/10* (2006.01)
*G06F 3/06* (2006.01)

(52) U.S. Cl.
CPC .......... *G06F 11/1096* (2013.01); *G06F 3/061* (2013.01); *G06F 3/0604* (2013.01); *G06F 3/067* (2013.01); *G06F 3/0619* (2013.01); *G06F 3/0644* (2013.01); *G06F 3/0652* (2013.01)

(58) Field of Classification Search
CPC .... G06F 3/0605; G06F 3/0614; G06F 3/0632; G06F 3/0688; G06F 11/1076; G06F 11/3034; G06F 11/3055; G06F 2211/1057; G06F 2211/1059; G06F 3/0619; G06F 3/0653; G06F 3/0689; G06F 3/0655
See application file for complete search history.

(56) References Cited

U.S. PATENT DOCUMENTS

| | | | |
|---|---|---|---|
| 9,405,617 B1 * | 8/2016 | Syu | G06F 11/108 |
| 9,430,434 B2 * | 8/2016 | Lo | G06F 1/3275 |
| 2005/0111315 A1 * | 5/2005 | Hwang | G11B 7/00375 369/47.14 |
| 2006/0123268 A1 * | 6/2006 | Forhan | G06F 11/1076 714/6.24 |
| 2014/0365717 A1 * | 12/2014 | Colgrove | G06F 3/0605 711/103 |

* cited by examiner

*Primary Examiner* — Guy Lamarre
(74) *Attorney, Agent, or Firm* — Daly, Crowley Mofford & Durkee, LLP (57) ABSTRACT

A computer program product, system, and method for generating and storing a parity chunk using at least a first chunk and a second chunk; detecting at least one unused segment within the first chunk; generating a new chunk as a third chunk; associating one or more used segments from the first chunk to the third chunk; filling an unused segment within the third chunk with new data; calculating a delta parity between the first chunk and the third chunk; and updating the stored parity chunk using the delta parity.

18 Claims, 7 Drawing Sheets

EFFICIENT GARBAGE COLLECTION FOR DISTRIBUTED STORAGE WITH FORWARD ERROR CORRECTION

BACKGROUND

As is known in the art, data storage systems may partition storage capacity into blocks of fixed sizes sometimes referred to as "chunks." Chunks may be used to store objects (i.e., a blob of user data), as well as object metadata. Some data storage systems include a garbage collection (GC) facility whereby storage capacity allocated to chunks may be reclaimed as corresponding objects are deleted or updated. GC can result in chunks being deleted and new chunks being created.

As is also known, distributed data storage systems may protect data using error-correcting codes (i.e., forward error correction). Some storage systems generate parity chunks by XOR'ing (i.e., using an exclusive OR operator) together chunks of user data. Parity chunks and user data chunks may be stored across one or more nodes of the distributed system, and such nodes may be in different geographic regions.

The combination of garbage collection and forward error correction in distributed storage can result in high levels of network traffic (e.g., wide-area network traffic) and reducing such traffic would be desirable.

SUMMARY

Described herein are structures and techniques for decreasing network traffic and other resource usage resulting from garbage collection in distributed storage systems that use forward error correction.

In accordance with one aspect of the disclosure, a method comprises: generating and storing a parity chunk using at least a first chunk and a second chunk; detecting at least one unused segment within the first chunk; generating a new chunk as a third chunk; associating one or more used segments from the first chunk to the third chunk; filling an unused segment within the third chunk with new data; calculating a delta parity between the first chunk and the third chunk; and updating the stored parity chunk using the delta parity.

In some embodiments, generating and storing a parity chunk includes storing the parity chunk at a second zone; and updating the stored parity chunk using the delta parity includes sending the delta parity from a first zone to the second zone. In certain embodiments, the first and second zones are in different geographic regions. In particular embodiments, the delta parity includes less data than the first chunk.

In some embodiments, generating the parity chunk includes XOR'ing at least the first and second chunks. In various embodiments, calculating the delta parity includes XOR'ing data within the unused segment of the first chunk with the new data, and updating the stored parity chunk includes XOR'ing the parity chunk with the delta parity.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the systems and methods sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

As used herein, the term "storage system" encompasses, for example, private or public cloud computing systems for storing data as well as systems for storing data comprising virtual infrastructure and those not comprising virtual infrastructure. As used herein, the terms "client" and "user" may refer to any person, system, or other entity that uses a storage system to read/write data. The term "I/O request" or simply "I/O" may be used herein to refer to a request to read or write data.

Figure 1:
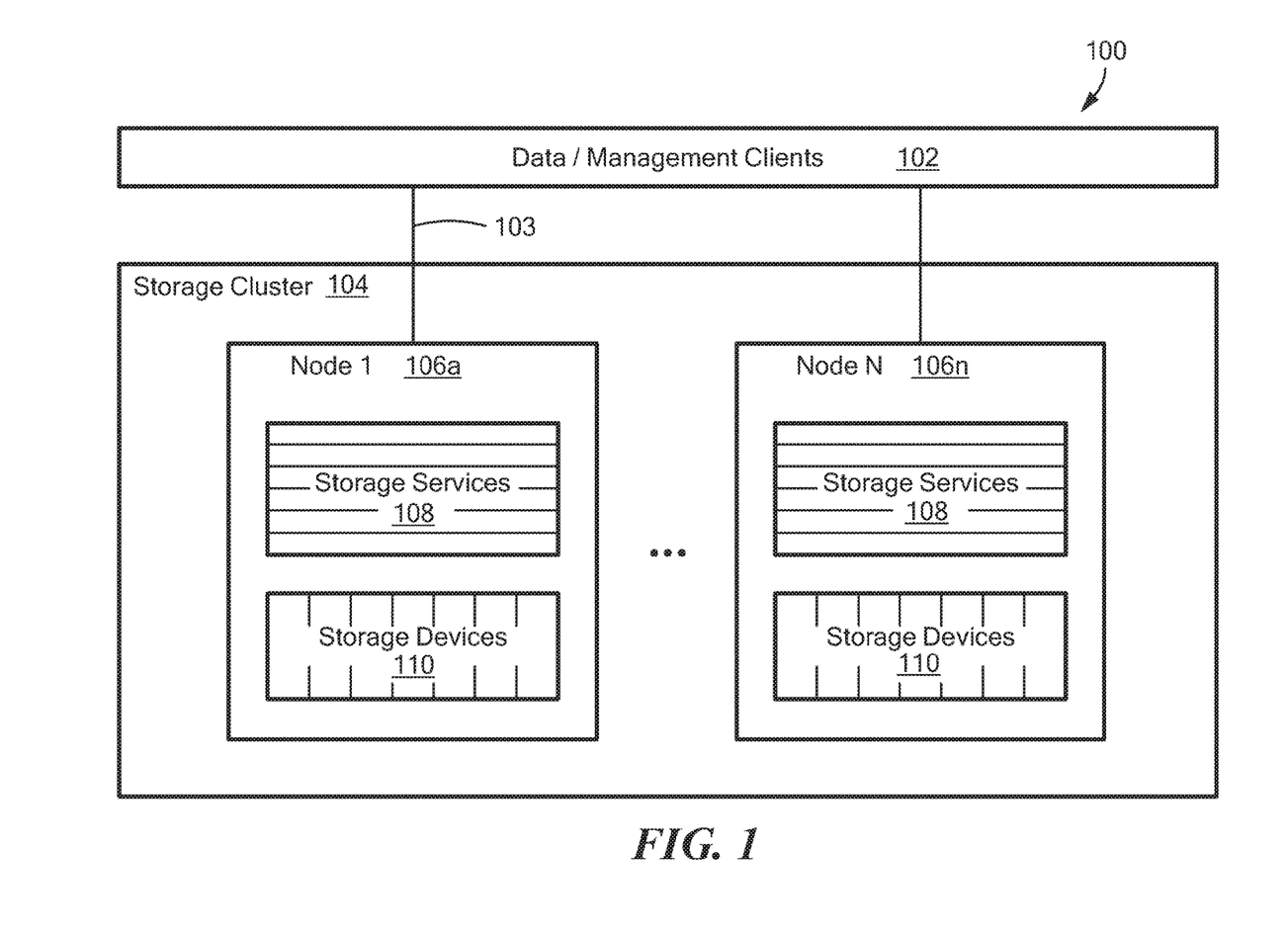
FIG. 1 is a block diagram of a distributed storage system, according to one embodiment.

Referring to FIG. 1, a distributed storage system 100 includes one or more clients 102 in communication with a storage cluster 104 via a network 103. The network 103 may include any suitable type of communication network or combination thereof, including networks using protocols such as Ethernet, Internet Small Computer System Interface (i SC SI), Fibre Channel (FC), and/or wireless protocols.

The storage cluster 104 includes one or more storage nodes 106a . . . 106n (generally denoted 106). Storage node 106a, which may be representative of other storage nodes, includes one or more services 108 and one or more storage devices 110. A storage node 106 may include a processor (not shown) configured to execute the services 108.

In some embodiments, a storage system may include nodes spread across multiple zones. In certain embodiments, a "zone" refers to a geographical region. Two or more zones may be connected via a wide-area network (WAN).

In particular embodiments, a storage node 106 may include one or more of these services: an authentication service to authenticate requests from clients 102; storage API services to parse and interpret requests from clients; a chunk management service to facilitate chunk allocation/reclamation for different storage system needs and monitor chunk health and usage; a storage server management service to manage available storage devices capacity and to track storage devices states; and a storage server service to interface with the storage devices 110.

In certain embodiments, the storage cluster 104 may be an object storage system. In some embodiments, the storage cluster 104 may be provided as Elastic Cloud Storage (ECS) from EMC Corporation of Hopkinton, Mass.

In operation, clients 102 send I/O requests to the storage cluster 104 to read/write data. In some embodiments where the storage cluster 104 is an object storage system, the I/O requests include object identifiers ("object IDs") to uniquely identify objects within the cluster 104. Any available storage node 106 may receive a client I/O request. The receiving node 106 may process the request locally and/or may delegate request processing to one or more peer nodes 106. For example, if a client issues an object read request, the receiving node may delegate/proxy the request to peer node where the object's data resides.

Figure 2:
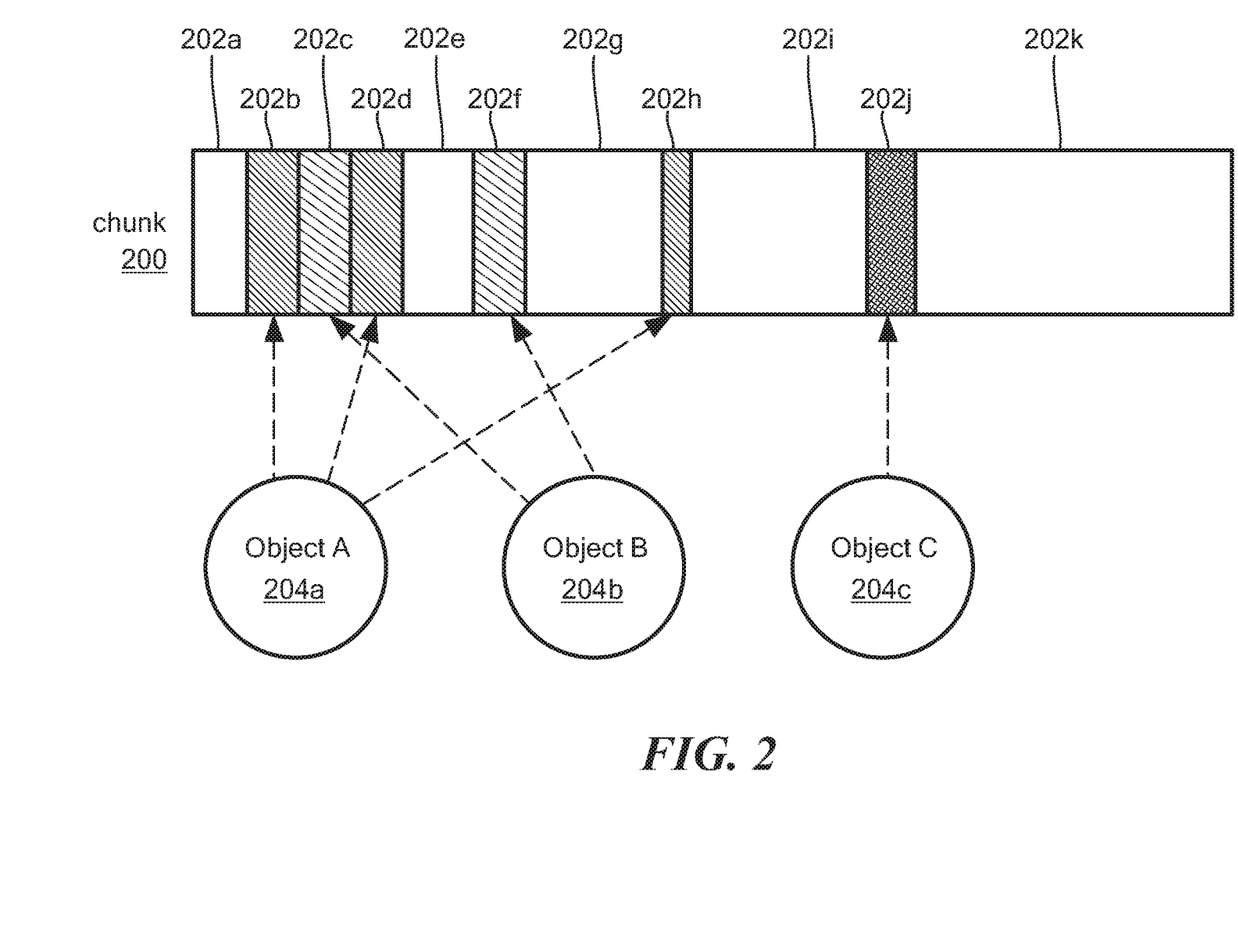
FIG. 2 is a diagram showing how a chunk can store data for multiple different objects, according to some embodiments.

Turning to FIG. 2, in some embodiments a storage system (e.g., storage system 100 of FIG. 1) may store object data and other user data within fixed-sized chunks. A given object may be stored within one or more different chunks, and a given chunk may store data for one or more different objects. The contents of a chunk may be appended to until the chunk becomes "full" (i.e., until its capacity is exhausted or nearly exhausted). When a chunk becomes full, it may be marked as "sealed." The storage cluster 104 treats sealed chunks as immutable.

As shown in FIG. 2, a chunk 200 may be comprised of one or more segments 202a-202k (202 generally), each of which stores a contiguous portion of data for a single object. A segment may be "used" or "unused." A segment may be considered used if it currently stores data for an active (i.e., not-deleted) user object; otherwise it may be considered unused. In the example shown, chunk 200 stores data for three objects 204a-204c. A first object 204a is stored within segments 202b, 202d, and 202h; a second object 204b is stored within segments 202c and 202f; and a third object 204c is stored within segment 202j. The remaining segments 202a, 202e, 202g, 202i, and 202k are unused. If the chunk 200 is not yet sealed, additional object data may be appended after last used portion of the chunk (i.e., object data may be added to the portion of the chunk denoted 202k).

Figure 3:
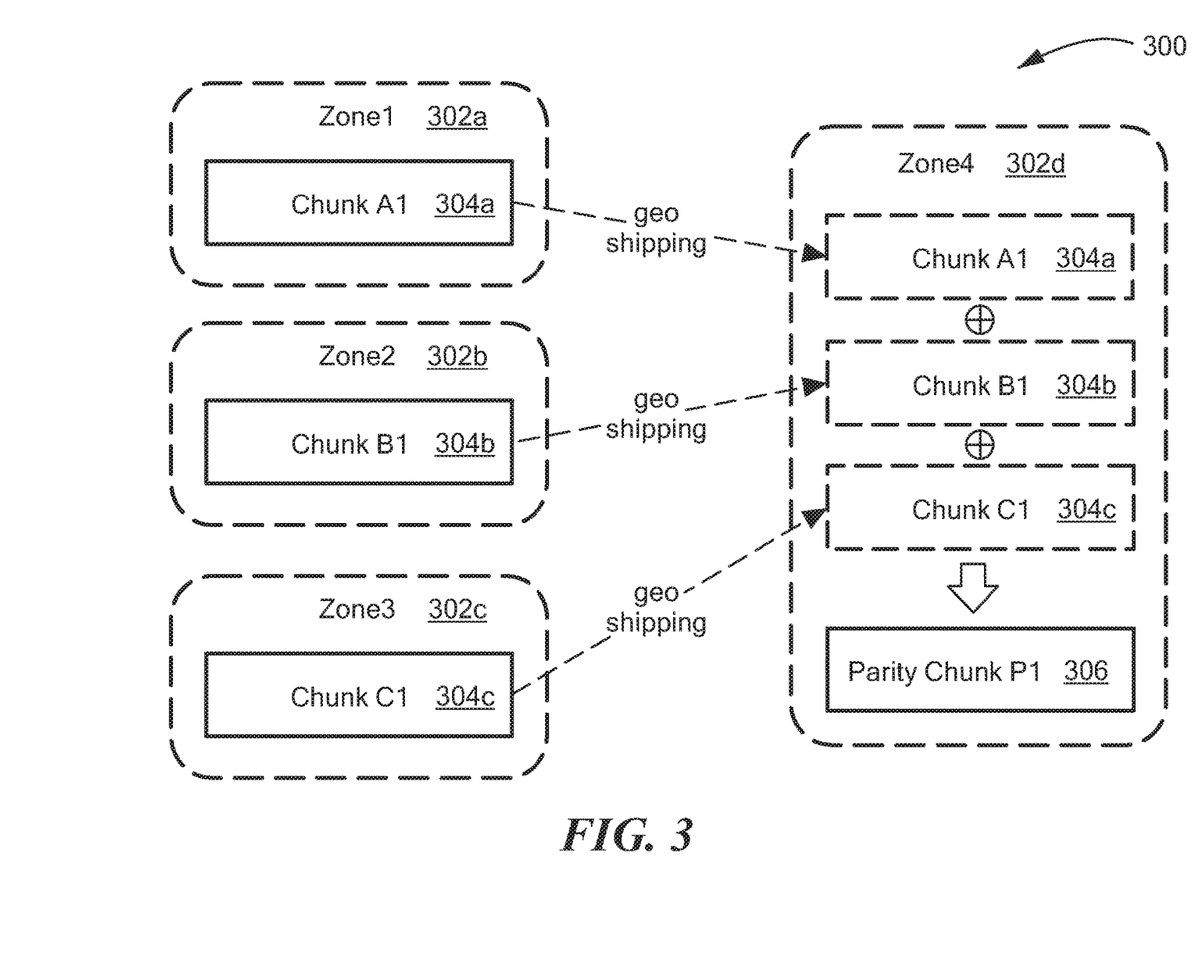
FIG. 3 is a diagram of a distributed storage system using forward error correction, according to some embodiments.

FIG. 3 shows a distributed storage system 300 having a plurality of zones 302a-302d (302 generally), according to an embodiment of the disclosure. Each zone 302 may process I/O write requests that result in chunks 304a-304c (304 generally) being written to storage within that zone. To protect user data, the system 300 may generate and storage parity chunks 306 by XOR'ing together two or more different chunks 304 of user data. The parity chunks 306 may allow the system to recover user data in the event that data within a zone 302 becomes unavailable (e.g., the zone itself becomes unavailable, data stored in the zone is corrupted, etc.). In many embodiments, a parity chunk 306 may be stored within a different zone from its constituent user data chunks 304. The zone to which a chunk 304 is initially written may be referred to as its "primary zone," and the zone to which a corresponding parity chunk is written may be referred to as its "secondary zone."

In the example of FIG. 3, zones 302a, 302b, and 302c may be primary zones for respective chunks 304a, 304b, and 304c. The primary zones 302a-302c may replicate their respective chunks 304a-304c to secondary zone 302d. In some embodiments, this replication may occur over a wide-area network (WAN). The secondary zone 302d XOR's together chunks 304a-304c to generate parity chunk 306, which may be stored within secondary zone 302d. If any one of the three primary zones 302a-302c becomes unavailable, its respective chunk 304a-304c can be received using the parity chunk 306 and user data chunks within the two available zones. For example, with parity chunk 306 P1=A1⊕B1⊕C1, user data chunk A1 304a could be recovered using the parity chunk P1 306, user data chunk B1 304b, and user data chunk C1 304c as A1=P1⊕B1⊕C1. In many embodiments, replicated chunks (e.g., chunks 304a-304c) are deleted from the secondary zone after a corresponding parity chunk (e.g., parity chunk 306) is generated and stored.

Figure 4:
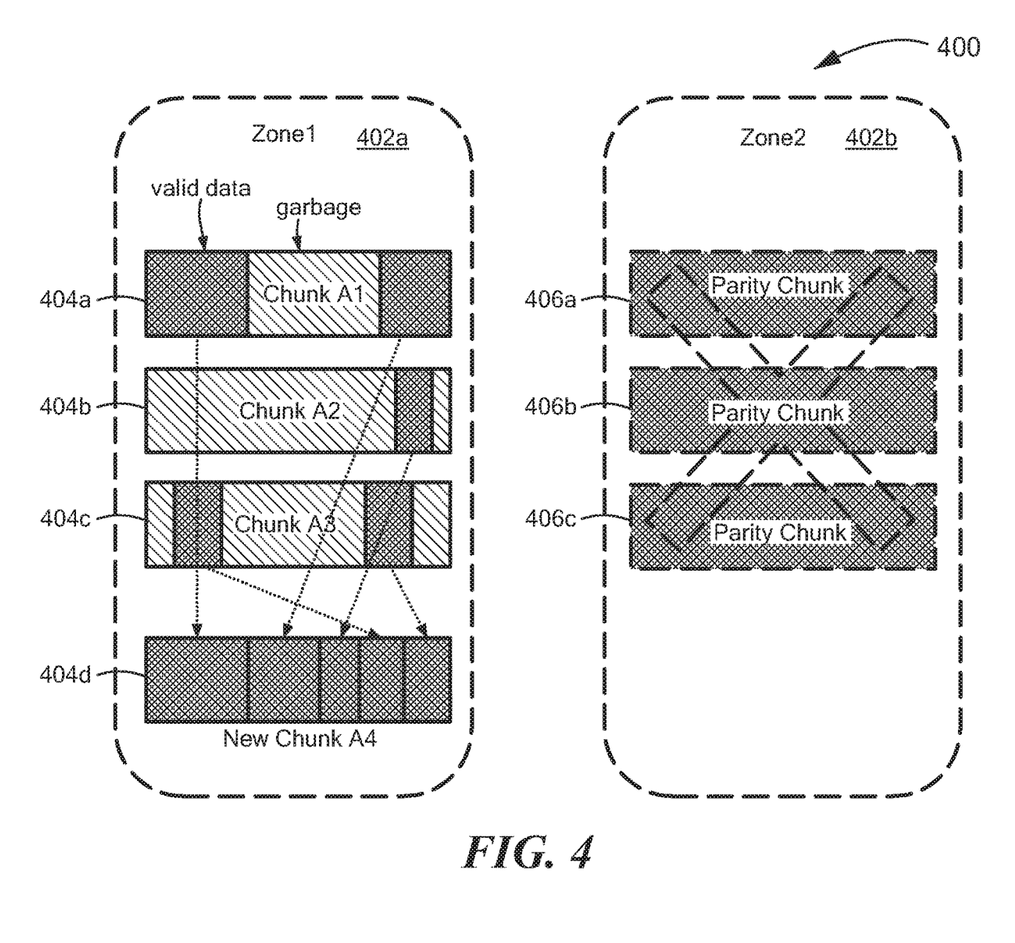
FIG. 4 is a diagram illustrating garbage collection in a distributed storage system using forward error correction, according to some embodiments.

Referring to FIG. 4, in many embodiments, a distributed storage system 400 performs garbage collection at the chunk level to reclaim unused storage consumption. In the embodiment shown, chunks 404a-404c each include one or more unused segments, which segments are denoted using hatching in FIG. 4. The unused segments may be the result of an object being deleted. Because chunks are treated as immutable, the unused segments cannot be reused. Instead, garbage collection may generate a new chunk 404d and associate the used segments from chunks 404a-404c thereto. In some embodiments, the used segments may be copied to the new chunk 404d. In other embodiments, the used segments may be "moved" to the new chunk 404d, meaning that they may be associated with the new chunk without having to copy the data therein. The old chunks 404a-404c may then be deleted and the corresponding storage capacity may be reclaimed.

It will be understood that a parity chunk formed from a given user data chunk will cease to be useful if that user data chunk is garbage collected as previously described. For example, referring to FIG. 4, assume that chunks 404a-404c in primary zone 402a were previously sent to secondary zone 402b, which, in response, generated and stored parity chunks 406a-406c. One or more of the parity chunks 406a-406c may cease to be useful after chunks 404a-404c are garbage collected. It is appreciated herein that it would be beneficial (e.g. in terms of bandwidth usage efficiency) to update the parity chunks 406a-406c without having to send new chunk 404d from the primary zone 402a to the secondary zone 402b. Techniques for doing the same are described below in conjunction with FIGS. 5-7.

Figure 5:
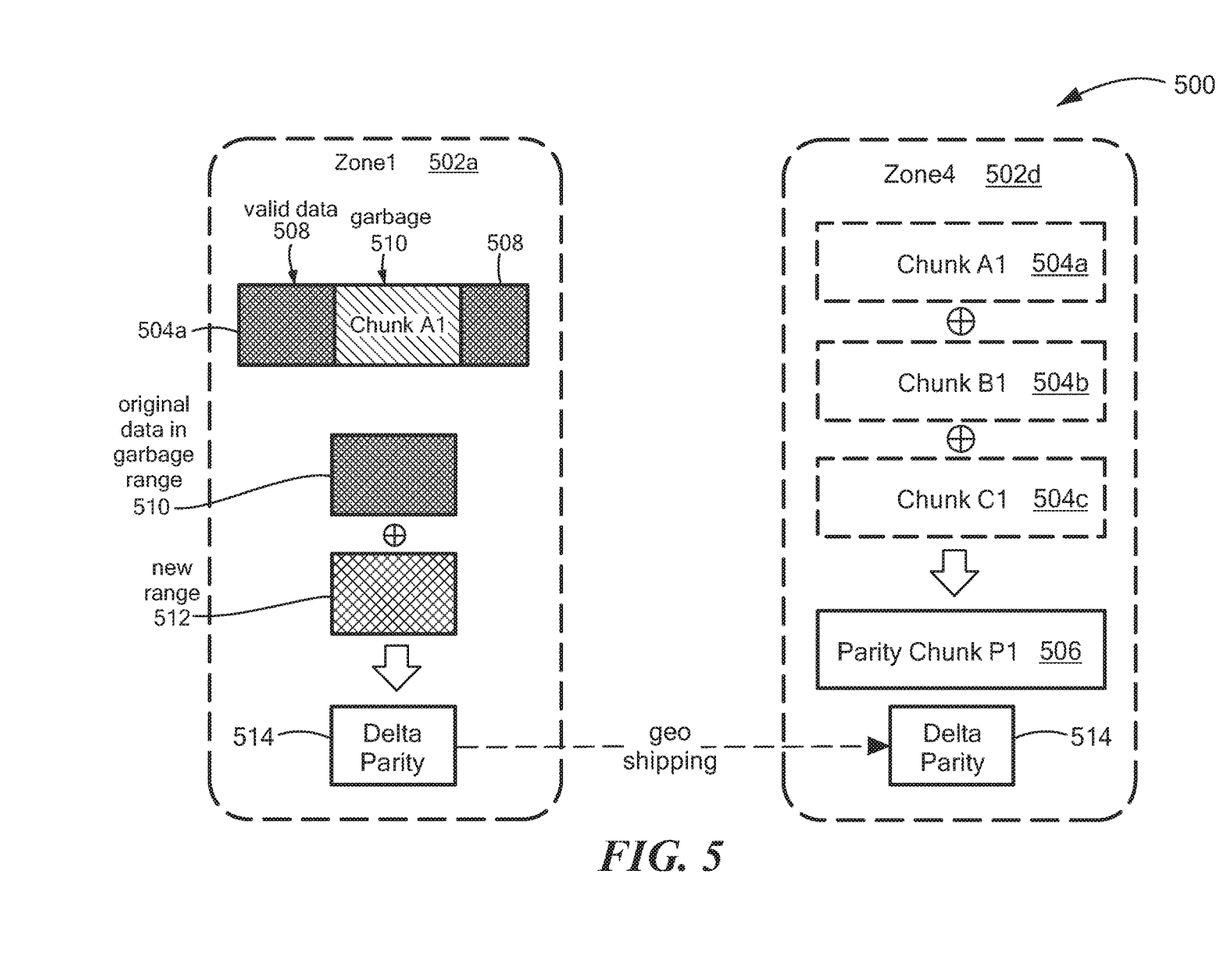
FIG. 5 is another diagram illustrating garbage collection in a distributed storage system using forward error correction, according to some embodiments.

Referring to FIG. 5, a distributed storage system 500 includes a plurality of zones (502 generally), with first and second zones 502a, 502b being shown. A first zone 502a includes a chunk 504a. A second zone 502b includes a parity chunk 506 generated as the XOR of chunk 504a replicated from first zone 502a, and two other chunks 504b, 504c, which may have been replicated from other zones not shown in FIG. 5.

The chunk 504a includes used segments 508, as well as unused segment 510. In this example, it is assumed that the storage system's garbage collector will reclaim the unused storage capacity by generating a new chunk having the used segments 508. In some embodiments, the data within the used segments 508 may be copied to the new chunk. In other embodiments, the used segments 508 may be "moved" to the new chunk, meaning that they may be associated with the new chunk without having to copy the data therein. Within the new chunk, the garbage collector may fill the unused segment 510 with "new data" 512. The new data 512 may correspond to new user data received into the system, or data from another chunk being processed by the garbage collector. As illustrated in FIG. 5, the new data 512 may be located at the same position (or "offset") within the new chunk as the unused segment 510 was located within existing chunk 504a.

In many embodiments, parity chunk 506 stored at the second zone 502b can be updated without having to replicate the new chunk between the zones 502a, 502b. In particular, according to various embodiments, the first zone 502a can calculate the XOR of the old data in the unused segment 510 with the new data in the same segment 512 to generate delta parity 514. As shown, delta parity 514 may be substantially smaller than the size of a full chunk. The first zone 502a then sends the delta parity 514 to the second zone 502b, which can use it to update the parity chunk 506 to reflect the changes made in the first zone 502a as a result of garbage collection. In particular, the existing parity chunk 506 can be updated as $P'=P\oplus(D<<\text{offset})$, where P is the existing parity chunk, D is the delta parity, and "offset" is the location of the unused segment 510 within chunk 504a. It will be understood that the XOR result of delta parity and the existing parity chunk is equivalent to replacing the unused data within chunk 504a and then re-calculating the XOR of chunks 504a, 504b, and 504c. This allows the parity chunk 506 to be updated without having copies of chunks 504a-504c. The updated parity chunk can then be stored within the second zone 502b, providing forward error correction for the new chunk (i.e., the chunk generated as a result of garbage collection within the first zone 502a).

It should be understood that the techniques described herein can be used to provide efficient garbage collection and forward error correction within distributed storage systems having an arbitrary number of zones 502.

Figure 6:
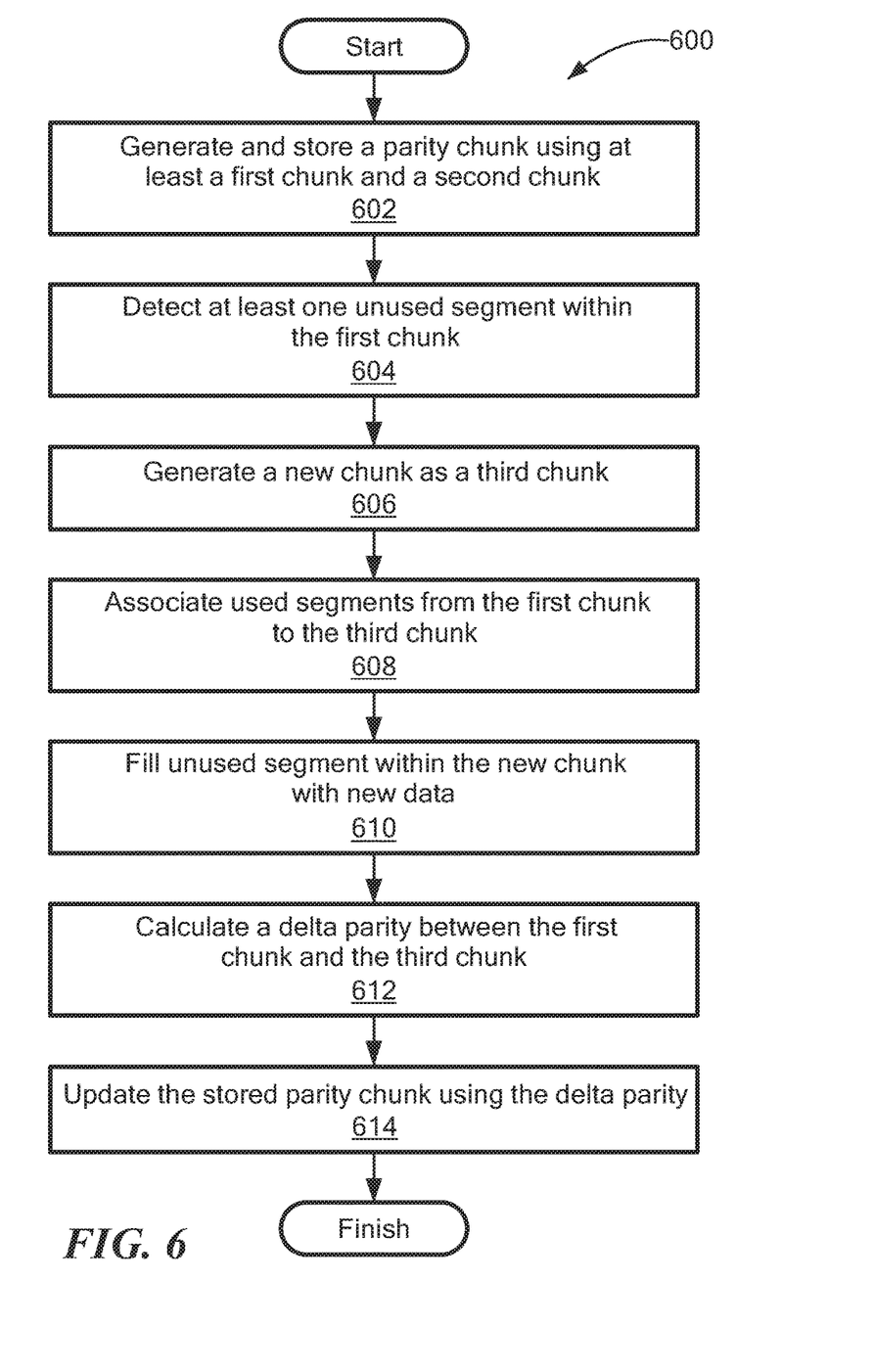
FIG. 6 is a flow diagram illustrating processing that may occur within a distributed storage system, according to one embodiment.

FIG. 6 is a flow diagram showing illustrative processing that can be implemented within a storage system (e.g., storage system 100, 300, 400, or 500 of FIGS. 1, 3, 4, 5). Rectangular elements (typified by element 602), herein denoted "processing blocks," represent computer software instructions or groups of instructions.

Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. In some embodiments, the processing blocks represent states and transitions, respectively, within a finite-state machine, which can be implemented in software and/or hardware.

Referring to FIG. 6, a method 600, begins at block 602, where a parity chunk is generated and stored using at least a first and a second user data chunk (or simply "chunk"). In many embodiments, the parity chunk may be generated by XOR'ing the chunks together. In some embodiments, the first chunk, the second chunk, and the parity chunk may each be stored within separate zones of a distributed storage system.

At block 604, at least one unused segment within the first chunk is detected. In certain embodiments, a garbage collector may detect that no user data (e.g., objects) are stored within the unused segment. At blocks 606 and 608, a new chunk ("third chunk") may be generated and used segments from the first chunk may be associated therewith. In some embodiments, the unused segments are copied to the new chunk. In other embodiments, the used segments may be "moved" to the new chunk, meaning that they may be associated with the new chunk without having to copy the data therein. At block 610, the portion of the third chunk corresponding to the unused segment of the first chunk may be filled using "new data" (i.e., new user data written to the storage system, or data copied from a different chunk as part of garbage collector).

At block 612, a delta parity is calculated between the first and third chunks and, at block 614, the delta parity is used to update the stored parity chunk. In some embodiments, the delta parity is calculated by XOR'ing data within the unused segment of the first chunk with the new data added to the third chunk; the parity chunk can then be updated by XOR'ing it with the delta parity, as described above in conjunction with FIG. 5. In some embodiments, the delta parity is sent from a first zone to a second zone before it is used to update the parity chunk stored within the second zone.

Figure 7:
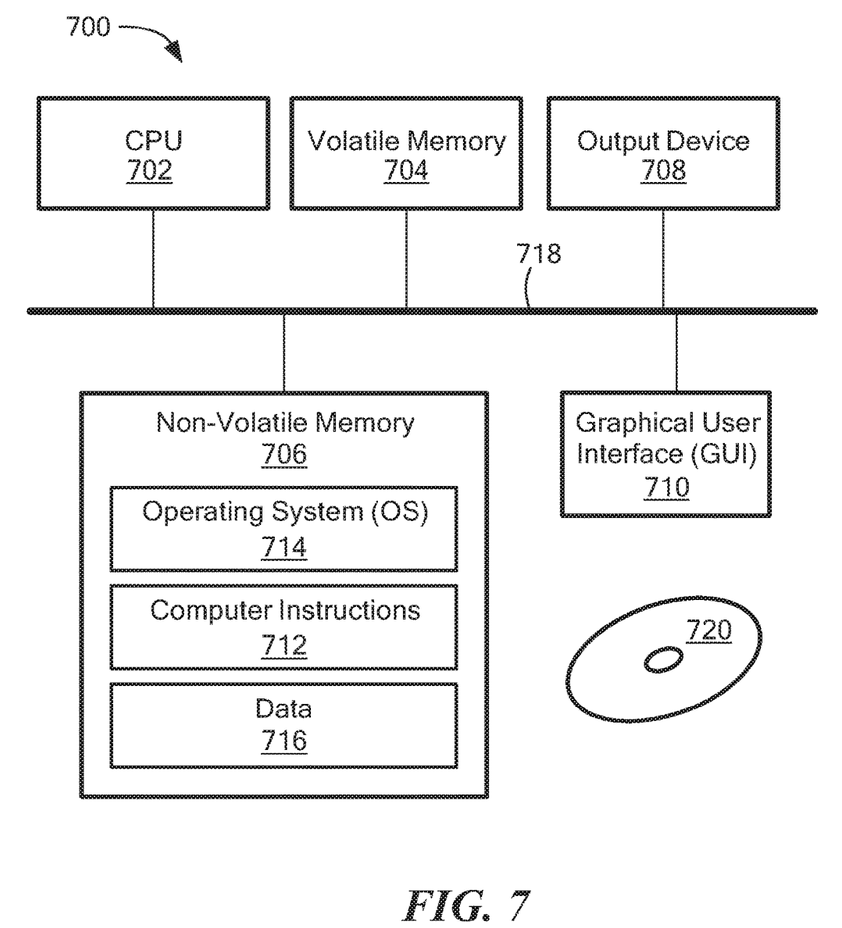
FIG. 7 is block diagram of a computer on which the processing of FIG. 6 may be implemented, according to an embodiment of the disclosure.

FIG. 7 shows an illustrative computer 700 that can perform at least part of the processing described herein, according to an embodiment of the disclosure. The computer 700 may include a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 may be configured to store computer instructions 712, an operating system 714, and data 716. In one example, the computer instructions 712 are executed by the processor 702 out of volatile memory 704. In one embodiment, an article 720 comprises non-transitory computer-readable instructions. In some embodiments, the computer 700 corresponds to a virtual machine (VM). In other embodiments, the computer 700 corresponds to a physical computer.

In some embodiments, a non-transitory computer readable medium 720 may be provided on which a computer program product may be tangibly embodied. The non-transitory computer-readable medium 720 may store program instructions that are executable to perform the processing of FIG. 6.

Referring again to FIG. 7, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
   generating and storing a parity chunk using at least a first chunk and a second chunk;
   detecting at least one unused segment within the first chunk, the unused segment within the first chunk containing unused data, the unused data starting at a first offset from a beginning of the first chunk;
   generating a new chunk as a third chunk;
   associating one or more used segments from the first chunk to the third chunk, the associating including at least one of copying the one or more used segments into the third chunk and mapping the one or more used segments to the third chunk;
   filling an unused segment within the third chunk with new data;
   calculating a delta parity based on the new data and the unused data, the delta parity being smaller in size than the parity chunk; and
   updating the stored parity chunk by combining the delta parity with a portion of the parity chunk that starts at a second offset from the beginning of the parity chunk, the second offset being the same as the first offset.

2. The method of claim 1 wherein:
   generating and storing a parity chunk includes storing the parity chunk at a second zone; and updating the stored parity chunk using the delta parity includes sending the delta parity from a first zone to the second zone.

3. The method of claim 2 wherein the first and second zones are in different geographic regions.

4. The method of claim 1 wherein the delta parity includes less data than the first chunk.

5. The method of claim 1 wherein generating the parity chunk includes XOR'ing at least the first and second chunks, and combining the delta parity with the portion of the parity chunk includes XOR'ing the delta parity with the portion of the parity chunk.

6. The method of claim 5 wherein calculating the delta parity includes XOR'ing data within the unused segment of the first chunk with the new data wherein updating the stored parity chunk includes XOR'ing the parity chunk with the delta parity.

7. A system comprising:
   processor;
   a volatile memory, and
   a non-volatile memory storing computer program code that when executed on the processor causes the processor to execute a process operable to perform the operations of:
   generating and storing a parity chunk using at least a first chunk and a second chunk;
   detecting at least one unused segment within the first chunk, the unused segment within the first chunk containing unused data, the unused data starting at a first offset from a beginning of the first chunk;
   generating a new chunk as a third chunk;
   associating one or more used segments from the first chunk to the third chunk, the associating including at least one of copying the one or more used segments into the third chunk and mapping the one or more used segments to the third chunk;
   filling an unused segment within the third chunk with new data;
   calculating a delta parity between the first chunk and the third chunk, based on the new data and the unused data, the delta parity being smaller in size than the parity chunk; and
   updating the stored parity chunk by combining the delta parity with a portion of data in the parity chunk that starts at a second offset from the beginning of the parity chunk, the second offset being the same as the first offset.

8. The system of claim 7 wherein:
generating and storing a parity chunk includes storing the parity chunk at a second zone; and
updating the stored parity chunk using the delta parity includes sending the delta parity from a first zone to the second zone.

9. The system of claim 8 wherein the first and second zones are in different geographic regions.

10. The system of claim 7 wherein the delta parity includes less data than the first chunk.

11. The system of claim 7 wherein generating the parity chunk includes XOR'ing at least the first and second chunks.

12. The system of claim 11
wherein calculating the delta parity includes XOR'ing data within the unused segment of the first chunk with the new data, and
wherein combining the delta parity with the portion of the parity chunk includes XOR'ing the delta parity with the portion of the parity chunk.

13. A computer program product tangibly embodied in a non-transitory computer-readable medium, the computer-readable medium storing program instructions that are executable to:
generate and storing a parity chunk using at least a first chunk and a second chunk;
detect at least one unused segment within the first chunk, the unused segment within the first chunk containing unused data, the unused data starting at a first offset from a beginning of the first chunk;
generate a new chunk as a third chunk;
associate one or more used segments from the first chunk to the third chunk, the associating including at least one of copying the one or more used segments into the third chunk and mapping the one or more used segments to the third chunk;
fill an unused segment within the third chunk with new data;
calculate a delta parity based on the new data and the unused data, the delta parity being smaller in size than the parity chunk; and
update the stored parity chunk by combining the delta parity with a portion of data in the parity chunk that starts at a second offset from the beginning of the parity chunk, the second offset being the same as the first offset.

14. The computer program product of claim 13 wherein:
generating and storing a parity chunk includes storing the parity chunk at a second zone; and updating the stored parity chunk using the delta parity includes sending the delta parity from a first zone to the second zone.

15. The computer program product of claim 14 wherein the first and second zones are in different geographic regions.

16. The computer program product of claim 13 wherein the delta parity includes less data than the first chunk.

17. The computer program product of claim 13 wherein generating the parity chunk includes XOR'ing at least the first and second chunks.

18. The computer program product of claim 17 wherein calculating the delta parity includes XOR'ing data within the unused segment of the first chunk with the new data, and combining the delta parity with the portion of the parity chunk includes XOR'ing the delta parity with the portion of the parity chunk.

* * * * *